April 27, 1965 TAKEHISA SAITO 3,180,683

HEADREST OR PILLOW FOR VEHICLES, CHAIRS AND THE LIKE

Filed March 25, 1964 4 Sheets-Sheet 1

Takehisa Saito
INVENTOR.

BY George B. Oujevolk
Attorney

April 27, 1965  TAKEHISA SAITO  3,180,683
HEADREST OR PILLOW FOR VEHICLES, CHAIRS AND THE LIKE
Filed March 25, 1964  4 Sheets-Sheet 3

Takehisa Saito
INVENTOR.
BY George B. Oujevolk
Attorney

United States Patent Office 3,180,683
Patented Apr. 27, 1965

3,180,683
HEADREST OR PILLOW FOR VEHICLES,
CHAIRS AND THE LIKE
Takehisa Saito, 1066 3-chome, Kitsuki,
Kawasaki-shi, Japan
Filed Mar. 25, 1964, Ser. No. 354,626
5 Claims. (Cl. 297—391)

This invention relates to a headrest or pillow for vehicles, chairs and the like.

An extended driving of a motor-vehicle usually results in fatigue of the driver or other persons in the vehicle. However, if each rider could have a suitable headrest or pillow behind his seat for a more relaxed and comfortable posture, it would considerably and effectively reduce their fatigue. This is also true in cases where a person sits on a seat other than that of a motor-vehicle.

The main object of this invention is to provide a headrest or pillow for vehicles, chairs and the like which will afford a comfortable sitting condition.

Another object of this invention is to provide a headrest or pillow which is simple in construction and easy to handle.

Another object of this invention is to provide a headrest or pillow capable of being assembled by an easy procedure.

Still another object of this invention is to provide a headrest or pillow which can easily be adjusted in its position to give the most comfortable condition.

A further object of this invention is to provide a headrest or pillow which will not allow shocks or vibrations to be transmitted to the head support member thereof.

The above and other objects and advantages of this invention will become apparent as the description proceeds, in connection with the accompanying drawings, in which the like parts are designated by the like reference characters, and in which.

Figure 1:
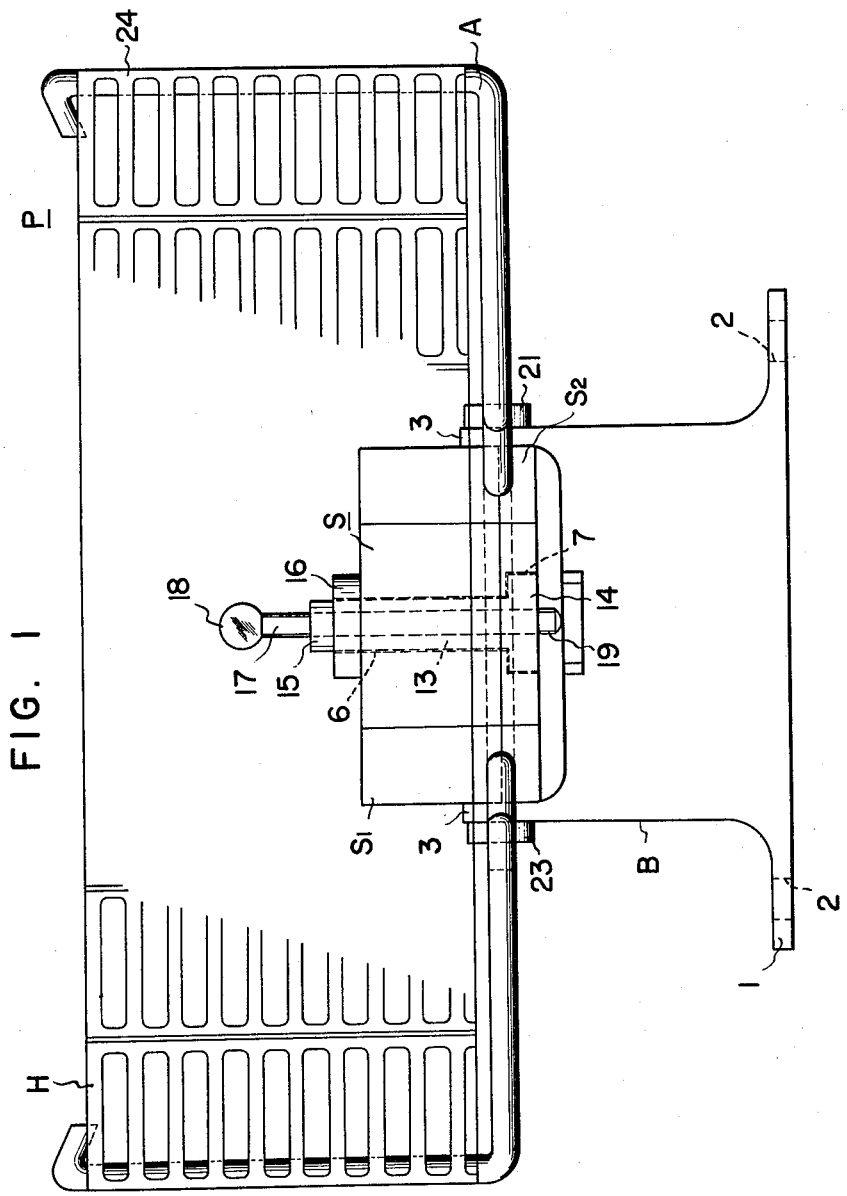
FIG. 1 is a front elevation of the headrest or pillow of this invention, with a head support or net thereof partly cut away.
Figure 2:
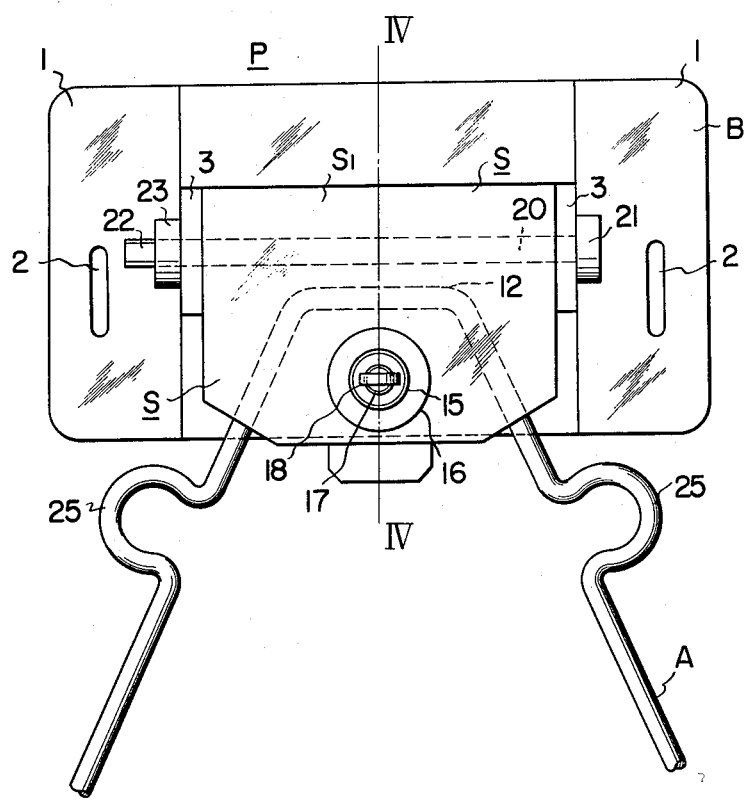
FIG. 2 is a fragmental plan view of the headrest or pillow of this invention.
Figure 3A:
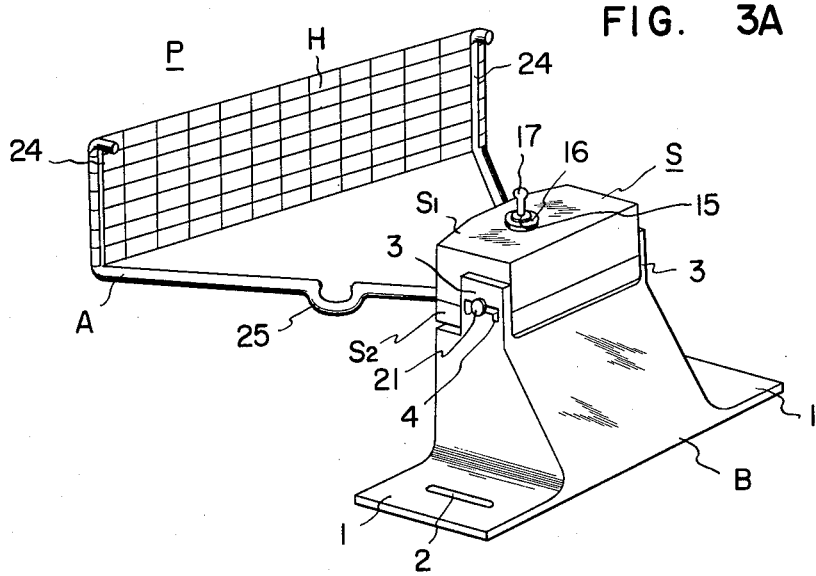
FIGS. 3A and 3B are perspective views of the headrests or pillows according to this invention.

Referring now to FIGS. 1, 2 and 3A, the headrest or pillow according to this invention is generally designated by the reference letter P and comprises a base B, support block S turnably mounted on the base B, a generally V-shaped arm A rigidly secured at one end thereof to the support block S, and a head support H.

Figure 5:
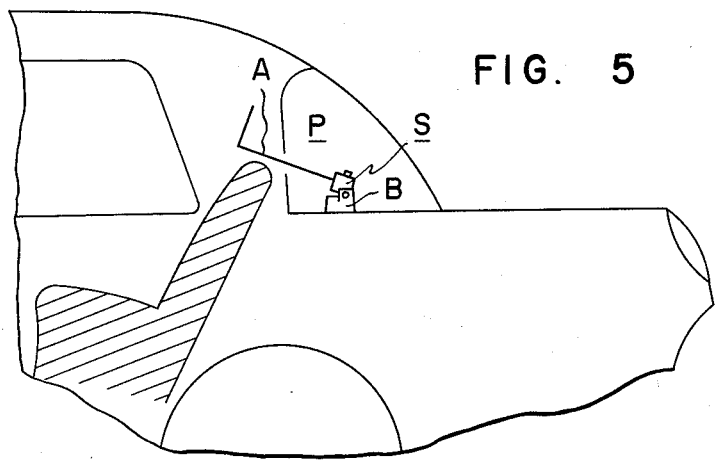
FIG. 5 is a schematic side elevation of the headrest or pillow of this invention, installed behind a rear seat of a motor-vehicle.
Figure 6:
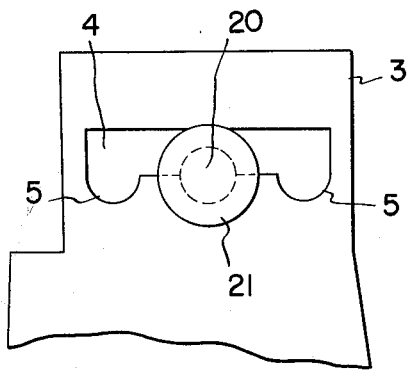
FIG. 6 is an enlarged fragmental side view showing an upright support extension and a horizontal slot therein, of the base of the headrest of this invention.

The base B is formed with a pair of horizontal extensions 1 each having a slot 2 serving to secure the base B to any suitable location behind a seat, for example, as shown in FIG. 5. On both sides of the base B are provided a pair of upright support extensions 3 each having therein a horizontal slot 4, which is formed with several recesses 5 on the lower edge thereof as particularly shown in FIG. 6.

Figure 4:
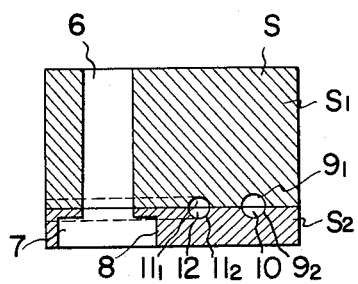
FIG. 4 is a sectional view of a ssupport block of this invention, the section being taken along the line IV—IV of FIG. 2.

The support block S comprises a pair of upper and lower block elements, $S_1$ and $S_2$, as particularly shown in FIG. 3A. The upper block element $S_1$ has therein a vertical hole 6, which is in alignment with a hole 7 vertically formed in the lower block element $S_2$ as shown in FIGS. 1 and 4. The hole 7 has an enlarged portion 8 for receiving a head of a bolt which will hereinafter be described in detail. The upper block element $S_1$ is also formed on the lower surface thereof with a horizontally extending lateral groove $9_1$ of semi-circular cross section, which groove $9_1$ is in registration with a similar groove $9_2$ formed on the upper surface of the lower block element $S_2$ and cooperates with the groove $9_1$ to form a laterally extending hole 10 of circular cross-section through the block S. The upper and lower block elements $S_1$ and $S_2$ have in the lower and upper faces thereof, respectively, generally V-shaped grooves $11_1$ and $11_2$ of semi-circular cross-section, which grooves $11_1$ and $11_2$ face or are in registration with each other to form a generally V-shaped through hole 12 of circular cross-section in the support block S. This V-shaped hole 12 through the block S may be formed in a diverging fashion toward the head support H and surrounds the vertical holes 6 and 7.

Through the holes 6 and 7 of the block S passes a tightening bolt 13 the lower end of which has a head 14 received on the enlarged portion 8 of the hole 7 as shown in FIG. 1. The bolt 13 includes an upper threaded portion 15 on which is screw-engaged a tightening nut 16 which cooperates with the thread of the portion 15 to tighten the upper and lower elements $S_1$ and $S_2$ against each other. The tightening bolt 13 is of hollow construction and internally threaded. An adjusting screw-rod 17 with a grip 18 is screw-engaged in the internal thread of the tightening bolt 13 and projects downwardly through the bolt 13 at 19 into abutting engagement with the upper face of the base as shown in FIG. 1. Thus, the adjusting screw-rod 17 may be displaced upwardly and downwardly through the tightening bolt 13 by manual operation of the grip 18.

The support block S of the above described construction is mounted on the base B and is turnable about a horizontal axis. A pivot bolt 20 is passed through the laterally extending hole 10 formed from a pair of semi-circular grooves $9_1$, $9_2$ of the support blocks and through a pair of horizontal slots 4 in the upright support extensions 3 of the base B. The two ends of the pivot bolt 20 may rest in a pair of correspondingly opposite recesses 5 of the horizontal slots 4 of the extensions 3. The ends of the pivot bolt 20 are respectively provided with a head 21 and a threaded portion 22 on which is screwed a nut 23. When the nut 23 is screw-tightened against the upright extension 3 of the base B, the pivot bolt 20 is rigidly held to the extensions. Thus, the support block S is turnable about the longitudinal axis of the pivot bolt 20. The pivot bolt 20 is snugly inserted in the lateral hole 10 of the block S so that when the nut 23 is tightened against the extensions 3, the block S can be held in any inclined position with regard to the base B.

The generally V-shaped arm A passes at the apex portion thereof through the generally V-shaped hole 12 of the block S and is rigidly held by the block as shown in FIG. 2. The arm A, as is shown in FIG. 3A, extends from the block S and is provided at both free ends thereof with a pair of upright members 24 between which the head support H is bridged. The support H serves as a headrest. At the half-way portions of the V-shaped are A are formed a pair of arcuately curved portions 25, which serve as shock absorbing means for reducing any shock being transmitted to the head support H. The head support H and arm A may preferably be made of a net and a steel wire, respectively.

The headrest or pillow P of this invention may be installed, for example, behind a seat of motor-vehicles as shown in FIG. 5, but it may be installed behind a seat of vehicles other than motor-vehicles.

The assembly of the headrest P of this invention may be carried out as follows. First, the lower block element $S_2$ is placed on the base B between the upright extension 3 thereof. Then, the pivot bolt 20 is passed through the pair of horizontal slots 4 of the extensions 3 and is placed in a suitable oppositely corresponding pair of the recesses 5. The V-shaped arm A is then placed at the apex portion thereof in the groove $11_2$ of the element $S_2$ and the groove $9_2$ is applied to the pivot bolt 20. The upper block element $S_1$ is then placed on the lower block element $S_2$ with the groove $9_1$ and $9_2$ and the grooves $11_1$ and $11_2$ in registration with each other respectively to form the holes 10 and 12 and with the vertical holes 6 and 7 in alignment with each other. The tightening bolt 13 is then inserted into the vertical holes 6 and 7, and the tightening nut 16 is screw-engaged onto the bolt 13 to tighten the block elements $S_1$ and $S_2$ into one body. Thus, the arm A and the pivot bolt 20 are rigidly held in the support block S. The nut 23 is applied onto the threaded portion 22 of the pivot bolt 20 and is loosely tightened. The adjusting screw-rod 17 is thereafter screwed into the internal thread of the tightening bolt 13 and is made to be projected downwardly so as to be brought into contact with the upper face of the base B.

In use, the base B is secured to a suitable location, for example, as shown in FIG. 5, and the arm A with the head support or net H is turned or pivoted about the horizontal axis to a most suitable position for supporting the head of the person sitting on the seat, by causing the adjusting screw-rod 17 to move upwardly or downwardly by operating the grip 18 thereof. The nut 23 is then tightened against the upright extension 3 of the base. Thus, the arm A and therefore the head support H are fixed in an adjusted position.

Figure 3B:
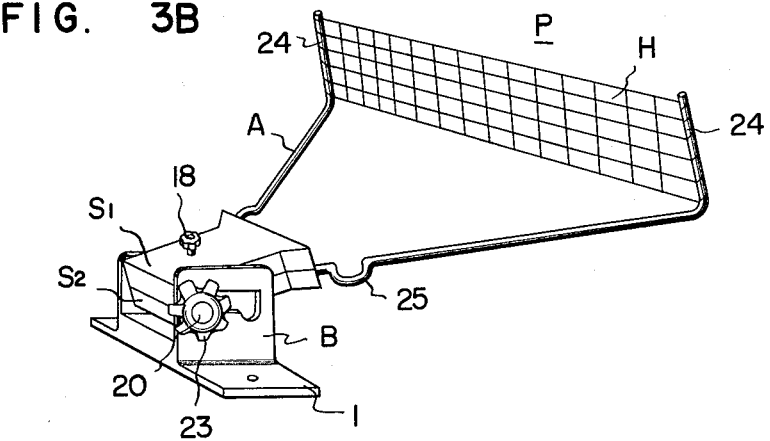

The adjustment of the position of the head support or net H may also be effected by transferring the pivot bolt 20 from an oppositely corresponding pair of recesses 5 into another pair of recesses. The transfer of the pivot bolt 20 is carried out by loosening the nut 23. Thus, the adjustment of the position of the head support H is possible in the direction of the arm A, as well as the pivotal adjustment thereof. The headrest shown in FIG. 3A can be modified as shown in FIG. 3B, in which the like members as the FIG. 3A are designated by the like reference characters. In the embodiment of FIG. 3B, the block elements $S_1$ and $S_2$ are elongated towards the arm $A_1$ and the grip 18 and the nut 23 of the pivot bolt 20 are respectively formed as handle knobs.

While preferred embodiments of the present invention have been shown and described, it is of course, to be understood that this invention is not limited to the embodiment shown, but can be modified without departing from the spirit and scope of the invention as set forth in the appended claims.

What I claim is:

1. A headrest or pillow for vehicles, chairs and the like, comprising a base, a horizontal pivot bolt carried on said base and turnable about its horizontal axis to be locked in any turning position, a support block consisting of a pile of upper and lower block elements detachably secured to each other, said upper block element having first and second grooves on the lower surface thereof, said lower block element having first and second grooves on the upper surface thereof, both said first and second grooves of the upper element and said first and second grooves of the lower element being respectively in registration with each other and cooperating to form first and second holes through said support block, said first holes snugly receiving said horizontal pivot bolt, an arm snugly received at one end thereof in said second hole of the block to be fixed thereto and extending substantially horizontally from said block, an adjusting screw-rod extending substantially vertically through said support block in screw-engagement therewith so as to be adjusted in its position in relation to said support block with the lower end of the rod in abutting engagement with the upper face of said base and with the upper end of the rod projecting from said block to enable the operation of the rod, said adjusting screw-rod lying out of planes including said pivot bolt, and a head support member secured to the free end of said arm.

2. A headrest or pillow according to claim 1, wherein said upper and lower block elements of the support block are detachably secured by means of a bolt-nut assembly extending vertically therethrough, and said adjusting screw-rod passes through said bolt-nut assembly longitudinally thereof.

3. A headrest or pillow according to claim 1, wherein said second hole of the support block is formed in V-shaped configuration and said arm is also formed in V-shaped configuration so as to conform to the hole, and wherein said head support member extends between the free ends of the arm.

4. A headrest or pillow according to claim 3, wherein said arm has at midway parts thereof arcuately curved portions.

5. A headrest or pillow according to claim 1, wherein said support block is displaceable in relation to said base in the longitudinal direction of said arm.

References Cited by the Examiner
UNITED STATES PATENTS

| | | | |
|---|---|---|---|
| 69,135 | 9/67 | Snowden | 297—409 |
| 171,539 | 12/75 | Starr | 297—409 |
| 236,212 | 1/81 | Cartwright | 297—402 |
| 373,142 | 11/87 | Koenig | 297—393 |
| 2,101,973 | 8/63 | Toth | 297—391 |

FOREIGN PATENTS 831,322   9/56   Great Britain.

FRANK B. SHERRY, *Primary Examiner.*